(12) United States Patent
Lin et al.

(10) Patent No.: US 6,893,724 B2
(45) Date of Patent: May 17, 2005

(54) SILICONE-POLYESTER-POLYSILICATE HYBRID COMPOSITIONS FOR THERMAL RESISTANCE COATING

(75) Inventors: Hsueh-Tso Lin, Taipei (TW); Kuan-Ching Chen, Taipei (TW)

(73) Assignee: Grand Tek Advance Material Science Co., Ltd., Taipei (TW)

(*) Notice: Subject to any disclaimer, the term of this patent is extended or adjusted under 35 U.S.C. 154(b) by 21 days.

(21) Appl. No.: 10/384,656

(22) Filed: Mar. 11, 2003

(65) Prior Publication Data

US 2004/0180221 A1 Sep. 16, 2004

(51) Int. Cl.[7] .......................... B32B 17/06; B32B 15/04; C08L 83/02; C08L 83/10
(52) U.S. Cl. ...................... 428/429; 428/447; 428/450; 525/477; 528/33; 528/39
(58) Field of Search ................................. 428/429, 447, 428/450; 525/474, 477; 528/33, 34, 39

(56) References Cited

U.S. PATENT DOCUMENTS 4,465,712 A * 8/1984 McVie ........................ 427/387

* cited by examiner

Primary Examiner—Michael J. Feely
(74) Attorney, Agent, or Firm—Birch, Stewart, Kolasch & Birch, LLP

(57) ABSTRACT

The present invention employs alkyl polysilicate to form silicone-polyester-polysilicate hybrid compositions with an appropriate proportion to modify silicone-polyester resin, or directly adds the alkyl polysilicate at an appropriate proportion into silicone-polyester resin to produce a hybrid composition. The composition in high baking temperature forms a hybrid structure having good thermal resistance, especially, hot-oil resistance and hot hardness, and good adhesion to metals such as carbon steel, stainless steel and aluminum. The present invention can be used in the field of the protective coating for heat-resistant metal such as frying pans and electric irons to be a kind of novel heat-resistant composition having hybrid structure. The composition in accordance with the present invention comprises (A)silicone-polyester; (B)alkyl polysilicate and the structure thereof comprises $(RO)_3-Si-O-(Si(OR)_2-O)_n-R$, where $n=0\sim20$ and R represents $-CH_3$, $-C_2H_5$, $-C_3H_7$, or $-C_4H_9$. The composition mentioned above comprises the compounds of (A) and (B) or the copolymer comprised by (A) and (B).

11 Claims, 1 Drawing Sheet

SILICONE-POLYESTER-POLYSILICATE HYBRID COMPOSITIONS FOR THERMAL RESISTANCE COATING

BACKGROUND OF THE INVENTION

1. Field of the Invention

This invention relates to hybrid compositions comprising silicone-polyester-polysilicate and to the use of such compositions for coating substrates.

2. Description of the Prior Art

Silicone resin is a kind of resin with good properties of thermal and weather resistance, and has been broadly used as heat-resistant and weather-resistant protective coating. Due to the nature of silicone resin has a poor compatibility with general organic macromolecules, employing organic macromolecules to modify silicone resin can improve the compatibility of silicone resin and organic macromolecules. Silicone-polyester resin is one kind of those. Silicone-polyester resin can not only improve the compatibility of silicone and organic macromolecules but also increase the mechanical character of silicone such as the film hardness and brittleness. Silicone-polyester resin can be broadly used as the non-stick coating for cookware, for example, flat or frying pans and bakeware such as baking trays, as well as the metal weather-resistant and heat-resistant protective coating such as the coating of electric irons. Many commercial products of silicone-polyester resin are sold on markets, such as SILIKOFTAL® HTT sold by Degussa Tego Chemie Service GmbH, MIRASOL 13-A-8762 (trade mark) produced by CCP, and KR-5235® sold by Shin Etsu. The persistence of conventional silicone-polyester resin is not in an ideal status while the silicone-polyester resin is used as the majority of protective coating for thermal resistance to stand hot-oil at 260° C. The main reason is that the content of reactive function group is deficient. For example, the content of the functional group of Si—OH is about 2–7 wt. % while silicone resin contains it, or the content of the functional group of Si—OCH$_3$ is about 15–22 wt. % while silicone resin contains it. The deficient content of the reactive function group makes the crosslinking density of synthesized silicone-polyester insufficient after curing. This leads the molecule structure of silicone-polyester to lack of denseness and the film in high temperature is easily penetrated by hot-oil. This further makes the film softened or blistered. The same reason, insufficient crosslinking density, also makes the hot hardness of the film in high temperature poor. Hence, increasing the crosslinking density of silicone-polyester is an effective method to strengthen the thermal resistance for silicone-polyester resin after curing. In U.S. Pat. No. 4,683,271 issued by Lin, et al., U.S. Pat. No. 4,608,421 issued by Lin, and U.S. Pat. No. 5,227,435 issued by Kang, et al., the methods for synthesizing and producing the silicon-polyester coating powder compositions are set forth. In U.S. Pat. No. 4,788,106 issued by Short, adding epoxy silane, aluminum acetylacetonate, and tetraalkyl titanate as catalysts into silicone-polyester resin can decrease the baking temperature of the silicone-polyester resin to 120° C. In U.S. Pat. No. 4,521,461 issued by McVie, et al., adding epoxy silane and titanium chelate into silicone-polyester resin can speed up the rate of cure of the silicone-polyester. In U.S. Pat. No. 4,472,465 issued by Burrill, adding amino silane and titanium chelate as catalysts into silicone-polyester resin can decrease the curing temperature of the silicone-polyester resin. In U.S. Pat. No. 4,465,712 issued by McVie, adding amino silane and a silane having 3 or 4 alkoxy or alkoxyalkoxy groups attached to silicone into silicone-polyester resin and baking them at 80° C. for two hours can increase the solvent resistance. However, the patents mentioned above are put in uses of metals or plastics protective coating and the main object is to decrease the curing temperature of silicone-polyester resin, but do not mention about the nature characters of compositions such as heat resistance. This invention differs to the patents mentioned above is that the main object of the present invention is to increase the crosslinking density of silicone-polyester resin and also to improve the thermal resistance such as hot-oil resistance and the hot hardness.

SUMMARY OF THE INVENTION

This invention provides a hybrid resin composition having good thermal resistance, especially for hot-oil resistance and hot hardness, to be used as protective coating for heat-resistant metal such as frying pans and electric irons. The resin in accordance with the present invention comprises the compositions as follows:

(A) silicone-polyester;

(B) alkyl polysilicate and the structure thereof comprises $(RO)_3$—Si—O—$(Si(OR)_2$—O$)_n$—R, where n=0~20 and R represents —CH$_3$, —C$_2$H$_5$, —C$_3$H$_7$, or —C$_4$H$_9$.

The hybrid resin mentioned above comprises the compounds of (A) and (B) or the copolymer comprised by (A) and (B).

The present invention employs alkyl polysilicate to form silicone-polyester-polysilicate hybrid compositions with an appropriate proportion to modify silicone-polyester resin, or directly adds the alkyl polysilicate at an appropriate proportion into silicone-polyester resin to produce a hybrid composition. The composition in high baking temperature forms a hybrid structure having good thermal resistance, especially, hot-oil resistance and hot hardness, and good adhesion to metals such as carbon steel, stainless steel and aluminum. The present invention can be used in the field of the protective coating for heat-resistant metal such as frying pans and electric irons to be a kind of novel heat-resistant composition having hybrid structure. The composition in accordance with the present invention comprises (A)silicone-polyester; (B)alkyl polysilicate and the structure thereof comprises $(RO)_3$—Si—O—$(Si(OR)_2$—O$)_n$—R, where n=0~20 and R represents —CH$_3$, —C$_2$H$_5$, —C$_3$H$_7$, or —C$_4$H$_9$. The composition mentioned above comprises the compounds of (A) and (B) or the copolymer comprised by (A) and (B).

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
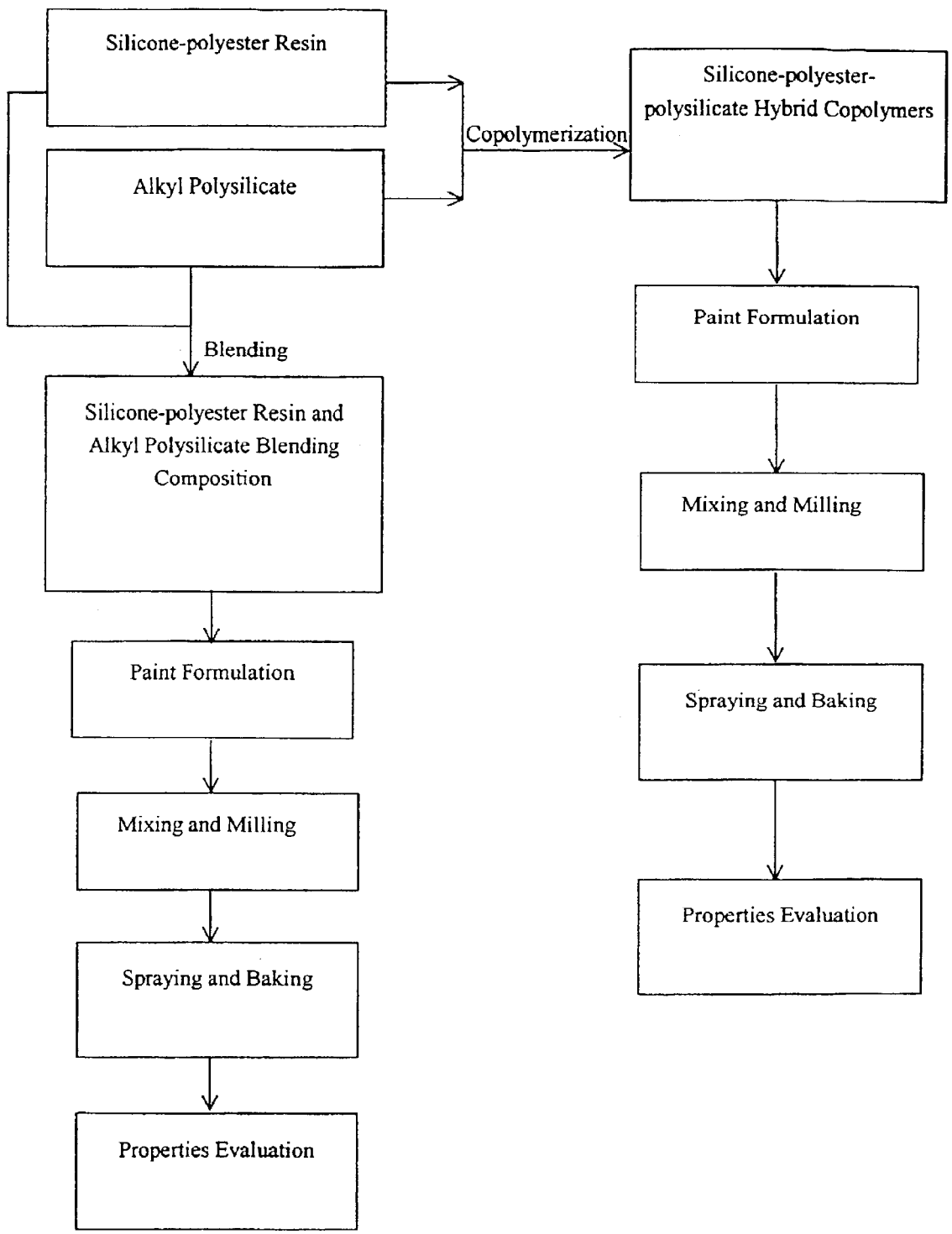
FIG 1. is a flowchart schematic in accordance with the present invention.

Some embodiments of the invention will now be described in greater detail. Nevertheless, it should be noted that the present invention can be practiced in a wide range of other embodiments besides those explicitly described, and the scope of the present invention is expressly not limited except as specified in the accompanying claims.

Further, the present invention will be described in detail with reference to the accompanying drawings. It should be noted that the drawings are in greatly simplified form and they are not drawn to scale. Moreover, dimensions have been exaggerated in order to provide a clear illustration and understanding of the present invention.

The present invention mainly provides a kind of hybrid compositions having thermal resistance, especially, hot-oil resistance and hot hardness, and employs the reaction produced by alkyl polysilicate and the functional group, C—OH, of silicone-polyester resin to form silicone-polyester-polysilicate copolymer. The copolymer is a kind of hybrid compositions or is formed by blending alkyl polysilicate with silicone-polyester resin. The novel heat-resistant hybrid compositions of this invention have good thermal resistance, especially, hot-oil resistance and hot hardness, after high temperature baking, having good adhesion to metals, and can be used as the protective coating for heat-resistant metal such as frying pans, baking trays and electric irons. The present invention mainly employs alkyl polysilicate to modify silicone-polyester resin for increasing the crosslinking density of silicone-polyester after baking and curing in order to improve the thermal resistance of silicone-polyester such as hot-oil resistance and hot hardness. Alkyl polysilicate has many functional groups of Si—OR, and wherein R represents —CH$_3$, —C$_2$H$_5$, —C$_3$H$_7$, and —C$_4$H$_9$. These functional groups can react with the functional group, C—OH, of silicone-polyester resin to form silicon-polyester-polysilicate copolymer. The copolymer has many functional groups, SiOR, and the functional groups, SiOR, can have a condensation reaction in high curing temperature, and hence the crosslinking density can be increased.

The flowchart schematic in accordance with the present invention is illustrated in FIG. 1. The one compound mentioned above, (A) silicone-polyester resin, is a kind of copolymer polycondensation reaction formed by silicone resin having the functional groups of Si—OH or Si—OCH$_3$ or Si—OC$_2$H$_5$ or Si—OC$_3$H$_7$ or Si—OC$_4$H$_9$ reacting with polyester having the functional group of C—OH. The synthesis method has been described in many patents such as U.S. Pat. No. 4,465,712 issued by McVie, U.K. Pat. No. 815,107 and No. 1,070,174. In the present invention, silicone-polyester resin can be obtained by following a general synthesis process. In general, silicone resin comprises the structure units as below, and where Q represents tetra-functional groups, T represents tri-functional groups, D represents di-functional groups, M represents single-functional group, and the molecular formula is showed as follows:

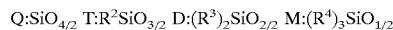

Q:SiO$_{4/2}$ T:R$^2$SiO$_{3/2}$ D:(R$^3$)$_2$SiO$_{2/2}$ M:(R$^4$)$_3$SiO$_{1/2}$

The substitute groups R$^2$, R$^3$, and R$^4$ can be —C$_6$H$_5$, —CH$_3$, —C$_3$H$_7$, —CH=CH$_2$, and the functional group can be Si—OH or Si—OCH$_3$ or Si—OC$_2$H$_5$ or Si—OC$_3$H$_7$ or Si—OC$_4$H$_9$. The silicone resin in the present invention is a general marketing product such as Silres® SY 430 or Silres® REN 168 produced by Wacker-Chemie GmbH. The molecular structure of Silres® SY 430 comprises the structure units as following: (C$_6$H$_5$)SiO$_{2/3}$ and (C$_6$H$_5$)$_2$SiO$_{2/2}$ and (C$_6$H$_5$)$_3$SiO$_{1/2}$, and the functional group comprises Si—OH and the content thereof is 5~6 wt. %. The polyester having C—OH functional group employs the functional group reacting with silicone resin, and the polyester is the product produced by the reaction of alcohol monomer and acid monomer. Alcohol monomer includes such as trimethylol ethane (TME), pentaerytritol, trimethylol propane (TMP), neopentyl glycol (NPG), ethylene glycol (EG), cyclohexanedimethanol, butanediol, and propylene glycol, etc. Acid monomer includes such as terephthalic acid (TPA), isophthalic acid (IPA), cyclohexanedicardoxylic acid, adipic acid, 1,2,4,-trimellitic anhydride (TMA), etc. The synthesized polyester needs the C—OH functional group contained in order to react with silicone resin.

Silicone-polyester resin employs the Si—OH or Si—OCH$_3$ or Si—OC$_2$H$_5$, Si—OC$_3$H$_7$ or Si—OC$_4$H$_9$ functional groups of silicone reacting with the C—OH function group of polyester. During the synthesis process, a few tetrabutyl titanate (TBT) or tetraisopropyl titanate (TPT) is added into the process as a catalyst. The character of silicone-polyester resin can achieve the preferred character by adjusting the silicone contained. In general silicone-polyester resin, the content of silicone can be 10–80% and the content of polyester can be 90–20%. The preferable content of silicone is 50–80% and polyester is 50–20% in order to have good thermal resistance. One composition, (B) alkyl polysilicate, of the present invention comprises (RO)$_3$—Si—O—(Si(OR)$_2$—O)$_n$—R, n=0~20, where R represents —CH$_3$, —C$_2$H$_5$, —C$_3$H$_7$, —C$_4$H$_9$. Alkyl polysilicate can be obtained from hydrolyzing Si(OR)$_4$, where R represents —CH$_3$, —C$_2$H$_5$, —C$_3$H$_7$, —C$_4$H$_9$. The different molecular weight of alkyl polysilicate can be obtained by the different hydrolyzing level. The use of alkyl polysilicate within the composition is to increase the crosslinking density of silicone-polyester resin after curing in order to increase thermal resistance.

Two methods for alkyl polysilicate increasing the thermal resistance of silicone-polyester resin: one is to add alkyl polysilicate into silicone-polyester resin in the later synthesizing process to modify silicone-polyester resin. While the viscosity of silicone-polyester reaches the required viscosity, the temperature of the reactor is decreased to 70° C. and 3–15 phr (per hundred resin based on silicone-polyester) alkyl polysilicate are added. Silicone-polyester-polysilicate copolymer is therefore formed by retaining the reaction temperature at 80° C.–110° C. for reaction time 20–60 minutes. However, the reaction is not easily controlled and the outcome is easily gelatinized while the temperature is higher than 110° C. While the reaction time is longer than 60 minutes, the viscosity increased or easy gelation causes a poor storing stabilization and a non-obviousness for hot-oil resistance. Hence, the preferred reaction temperature is 85° C.–100° C. and the reaction time is 30–45 minutes. Another method is a blending method by directly blending 3–15 phr alkyl polysilicate with silicone-polyester resin to form heat-resistant hybrid compositions. The improved effect of this method is less than the former one although the hot-oil resistance of silicone-polyester resin also can be increased. The content of alkyl polysilicate directly affects the thermal resistance of the composition. This invention finds that there is no obvious effect on the improved hot-oil resistance and hot hardness of silicone-polyester resin while the modified weight or added weight of alkyl polysilicate is less than 3 phr, Although the hot-oil resistance and hot hardness of silicone-polyester can be improved while the modified weight or added weight of alkyl polysilicate is higher than 15 phr. However, if the film thickness of the composition were thicker than 20 μm, it would be easily cracking after baking. The preferred modified weight of alkyl polysilicate is 5–12 phr.

The silicone-polyester-polysilicate copolymer or the hybrid compositions, silicone-polyester resin and alkyl polysilicate, is blended with aluminum paste, silicone oil, dispersion agent, solvent and filler to form a kind of coating formula. Spraying the coating on aluminum pots and electric irons pretreated by sandblasting and then baking them for 15–20 minutes at 300° C.–320° C. to form a 20–25 μm dry coating film. The aluminum pot through spraying coating is tested in a 260° C. hot-oil resistant test, and the coating using silicone-polyester-polysilicate as its majority can stand the hot-oil at 260° C. over 40 test circulations, and the 230° C. hot hardness of a coated electric iron can be 2H to H pencil hardness; whereas silicone-polyester compositions not containing (B) have 10 test circulations 260° C. hot-oil resistant and exhibit F pencil hardness at 230° C. only.

Some synthesis examples and detailed descriptions of the synthesis methods and steps are described as below in order to help understanding the synthesis method of this invention.

EXAMPLE 1

TME (337 parts) and IPA (285 parts) are put into a 5 liters reactor for mixing, wherein the reactor equips a good heating system, a mechanical stirrer, and a $N_2$ gas apparatus. After introducing $N_2$ gas and heating the reactor to 160° C., xylene (12 parts) is added into the reactor. After retaining the temperature at 160° C. for 1 hour, the temperature is raised to 220° C. and retaining at 220° C. for about 4 hours. Then, some sample is taken for testing the acid value of the mixture in the reactor. When the acid value is less than 10 mgKOH/g, the heating process is stopped, and cooling the mixture to 120° C. Next, the solvent of PMA (propylene glycol monoethyl ether acetate, 140 parts) is added into the reactor and retaining the solid components at 80 wt. %. The polyester is heated to 100–120° C., and silicone resin Silres® SY 430 (790 parts), TBT (1.4 parts), and PMA (640 parts) are added. Under $N_2$ surrounding, the reaction temperature is kept at 120° C.–130° C. for two hours, and a transparent silicone-polyester resin solution can be obtained. After cooling the silicone-polyester resin solution to 70° C., the mixed solution (200 parts) of alkyl polysilicate and xylene (alkyl polysilicate:xylene=1:1) is added, and then the reactant is heated to 95° C. and retaining for 40 minutes. Subsequently, PMA (375 parts) and n-butanol (160 parts) are added. Finally, the reaction is terminated, and the resin solution of transparent silicone-polyester-polysilicate compositions with solid component at 50 wt. % can be obtained. Afterwards, the obtained resin is mixed with adequate aluminum paste, silicone oil, dispersion agent, solvent and filler to become a coating formula. Spraying the coating on aluminum pots and electric irons pretreated by sandblasting and then baking them for 20 minutes at 300° C. to form a 20–25 μm dry coating film. The coated aluminum pot is tested in a 260° C. hot-oil resistant test, and can withstand 80 test circulations (the above-mentioned 260° C. hot-oil resistant test includes introducing vegetable oil into the pot through spraying coating; heating the pot at 260° C. for one hour, cooling it down to the room temperature; and then checking whether the film of the pot softening or not by finger nails and whether the film of the pot blistering or not by naked eyes. If the above-mentioned statuses are not found, one hot-oil circulation is finished). The hot hardness (at 230° C.) of a coated electric iron can be H pencil hardness.

EXAMPLE 2

TME (337 parts) and IPA (285 parts) are put and mixed in a 5 liters reactor having a good heating system, a mechanical stirrer, and a $N_2$ gas apparatus. After introducing $N_2$ gas and raising the temperature to 160° C., xylene (12 parts) is added, and the temperature is kept at 160° C. for one hour. Then, the temperature is raised to 220° C. and retaining at 220° C. about 4 hours. Subsequently, the acid value is tested. The heating process is stopped and cooling to 120° C. when the acid value is less than 10 mgKOH/g. Next, the solvent of PMA (140 parts) is added, and keeping the solid component at 80 wt. %. The polyester is heated to 100–120° C. and, silicone resin Silres® REN 168 (790 part), TBT (1.4 parts), and PMA (640 parts) are added. Under $N_2$ surrounding, the reaction temperature is kept at 120° C.–130° C. for two hours, and a transparent silicone-polyester resin solution can be obtained. Thereafter, the silicone-polyester resin solution is cooled down to 70° C., and the mixed solution (200 parts) of alkyl polysilicate and xylene (alkyl polysilicate:xylene=1:1) is added. The reactant is heated to 95° C. and retaining 40 minutes. Next, after adding PMA (375 parts) and n-butanol (160 parts), the reaction is terminated, and the resin solution of transparent silicone-polyester-polysilicate compositions with solid component at 50 wt. % can be obtained. Then silicone-polyester-polysilicate is mixed with adequate aluminum paste, silicone oil, dispersion agent, solvent and filler to become a coating formula. Spraying the coating on aluminum pots and electric irons pretreated by sandblasting and then baking them for 20 minutes at 300° C. to form a 20–25 μm dry coating film. The coated aluminum pot is tested in a 260° C. hot-oil resistant test, and can withstand 60 test circulations. The hot hardness (at 230° C.) of a coated electric iron can be 2H pencil hardness.

EXAMPLE 3

TME (285 parts), NPG (52 parts), and IPA (285 parts) are put and mixed in a 5 liters reactor having a good heating system, a mechanical stirrer, and a $N_2$ gas apparatus. After introducing $N_2$ gas and raising the temperature to 160° C., xylene (12 parts) is added, and the temperature is kept at 160° C. for one hour. Next, the temperature is raised to 220° C. The temperature is kept at 220° C. about 4 hours, and then the acid value of the mixture is tested. When the acid value is less than 10 mgKOH/g, the heating process is stopped and cooling the reaction to 120° C. Subsequently, the solvent of PMA (140 parts) is added and the solid component is kept at 80 wt. %. Then, the polyester is heated to 100–120° C., and silicone resin, Silres® REN 168 (790 part), TBT (1.4 parts), and PMA (640 parts) are added. Under $N_2$ gas ambient, the reaction temperature is kept at 120° C.–130° C. for 2 hours, and then a transparent silicone-polyester resin solution can be obtained. After cooling down the silicone-polyester resin solution to 70° C., the mixed solution (200 parts) of alkyl polysilicate and xylene (alkyl polysilicate:xylene=1:1) are added, and the reactant is heated to 95° C. After keeping the temperature at 95° C. for 40 minutes and adding PMA (375 parts) and n-butanol (160 parts), the reaction is terminated, and then the resin solution of transparent silicone-polyester-polysilicate compositions with solid component at 50 wt. % can be obtained. Then silicone-polyester-polysilicate is mixed with adequate aluminum paste, silicone oil, dispersion agent, solvent and filler to become a coating formula. Spraying the coating on aluminum pots and electric irons pretreated by sandblasting and then baking them for 20 minutes at 300° C. to form a 20–25 μm dry coating film. The coated aluminum pot is tested in a 260° C. hot-oil resistant test, and can withstand 42 test circulations. The hot hardness (at 230° C.) of a coated electric iron can be H pencil hardness.

Although specific embodiments have been illustrated and described, it will be obvious to those skilled in the art that various modifications may be made without departing from what is intended to be limited solely by the appended claims.

What is claimed is:

1. A heat-resistant material, said material being a kind of silicone-polyester-polysilicate composition consisting essentially of:
 1) silicone-polyester
 2) alkyl polysilicate
 wherein said material is formed by a combination method of bonding said silicone-polyester and said alkyl polysilicate, and a solid weight ratio of said alkyl polysilicate to said silicone-polyester is about 3:100 to 15:100;
 wherein said silicone-polyester comprises a silicone resin and a polyester, wherein a combination percentage of said silicone resin is higher than said polyester, and said silicone-polyester has OH functional group which can react with said alkyl polysilicate; and said alkyl polysilicate is $(RO)_3$—Si—O—$[Si(OR)_2$—O$]_n$—R, wherein n represents a numeric and about less than 20 and R represents an alkyl functional group.

2. The material according to claim 1, wherein said silicone resin is from 50% to 80% by weight of said silicone-polyester, said polyester is from 50% 20% by weight of said silicone-polyester and said alkyl functional group of said alkyl polysilicate comprises —$CH_3$, —$C_2H_5$, —$C_3H_7$, or —$C_4H_9$.

3. The material according to claim 2, wherein said combination method comprises a step for copolymerizing said silicon-polyester and said alkyl polysilicate.

4. The material according to claim 2, wherein said combination method comprises a step for polymerizing said silicone and said polyester, and then adding said alkyl polysilicate for a blending reaction.

5. The material according to claim 1, wherein a coating formed from said heat-resistant material withstands 80 circulations of a 260° C. hot-oil resistant test.

6. A heat-resistant material utilized as a substrate coating, said material being a kind of silicone-polyester-polysilicate composition consisting essentially of:
 1) silicone-polyester
 2) alkyl polysilicate
 wherein said material is formed by a combination method of bonding said silicone-polyester and said alkyl polysilicate, and a solid weight ratio of said alkyl polysilicate to said silicone-polyester is about 3:100 to 15:100;
 wherein said silicone-polyester comprises a silicone resin and a polyester, wherein a combination percentage of said silicone resin is higher than said polyester, and said silicone-polyester has OH functional group which can react with said alkyl polysilicate; and said alkyl polysilicate is $(RO)_3$—Si—O—$[Si(OR)_2$—O$]_n$—R wherein n represents a numeric and about less than 20 and R represents an alkyl functional group.

7. The material according to claim 6, wherein said substrate comprises metal or glass.

8. The material according to claim 7, wherein said silicone resin is from 50% to 80% by weight of said silicone-polyester, said polyester is from 50% m 20% by weight of said silicone-polyester, and said alkyl functional group of said alkyl polysilicate comprises —$CH_3$, —$C_2H_5$, —$C_3H_7$, or —$C_4H_9$.

9. The material according to claim 7, wherein said combination method comprises a step for copolymerizing said silicon-polyester and said alkyl polysilicate.

10. The material according to claim 7, wherein said combination method comprises a step for polymerizing said silicone and said polyester, and then adding said alkyl polysilicate for a blending reaction.

11. The material according to claim 6, wherein the substrate coating formed from said heat-resistant material withstands 80 circulations of a 260° C. hot-oil resistant test.

* * * * *